United States Patent
Yoo et al.

(10) Patent No.: US 7,548,286 B2
(45) Date of Patent: Jun. 16, 2009

(54) LIQUID CRYSTAL DISPLAY DEVICE AND METHOD FOR MANUFACTURING THE SAME

(75) Inventors: Soon Sung Yoo, Gunpo-si (KR); Heung Lyul Cho, Suwon-si (KR); Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 335 days.

(21) Appl. No.: 11/502,470

(22) Filed: Aug. 11, 2006

(65) Prior Publication Data

US 2007/0035678 A1  Feb. 15, 2007

(30) Foreign Application Priority Data

Aug. 11, 2005  (KR) ............... 10-2005-0073698

(51) Int. Cl.
  *G02F 1/1333* (2006.01)
(52) U.S. Cl. .................... 349/54; 349/106
(58) Field of Classification Search ........ 349/115, 349/54

See application file for complete search history.

(56) References Cited

U.S. PATENT DOCUMENTS

| 6,904,300 | B1 * | 6/2005 | Maattanen et al. | 455/575.1 |
| 2003/0030768 | A1 * | 2/2003 | Sakamoto et al. | 349/113 |
| 2006/0024858 | A1 * | 2/2006 | Kumomi et al. | 438/89 |
| 2007/0205420 | A1 * | 9/2007 | Ponjee et al. | 257/80 |

* cited by examiner

*Primary Examiner*—Sung H Pak
*Assistant Examiner*—Eric Wong
(74) *Attorney, Agent, or Firm*—McKenna Long & Aldridge LLP

(57) ABSTRACT

An LCD device and a method for manufacturing the same are disclosed. The LCD device comprises first and second substrates facing each other, a liquid crystal layer formed between the first and second substrates, a pixel region defined on the first and the second substrates, at least one micro hole formed from a rear surface of any one of the first and second substrates in the pixel region, the rear surface being an opposite surface of the substrate with respect to the liquid crystal layer, and a non-transparent material at least partially filled in the micro hole.

20 Claims, 8 Drawing Sheets

BACK LIGHT

LIQUID CRYSTAL DISPLAY DEVICE AND METHOD FOR MANUFACTURING THE SAME

This application claims the benefit of Korean Patent Application No. P2005-0073698, filed on Aug. 11, 2005, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device and a method for manufacturing the same to minimize degradation of perception in a portion where a defect may be generated.

2. Discussion of the Related Art

Demands for various display devices have increased with the development of an information society. Accordingly, many efforts have been made to research and develop various flat display devices such as liquid crystal display (LCD), plasma display panel (PDP), electroluminescent display (ELD), and vacuum fluorescent display (VFD). Some types of flat display devices have already been incorporated as displays for various types of equipment.

Among the various flat display devices, liquid crystal display (LCD) devices have been most widely used because of their excellent picture quality, thin profile, lightness in weight, and low power consumption, thus providing an advantageous substitute for a Cathode Ray Tube (CRT) display. In addition to mobile type LCD devices such as notebook computers, LCD devices have been developed for computer monitors and televisions to receive and display broadcasting signals.

In order to incorporate LCD devices in various fields as a general display, the key to developing LCD devices depends on whether LCD devices can produce a high quality picture, such as high resolution and high luminance with a large-sized screen, while still maintaining lightness in weight, thin profile, and low power consumption.

Hereinafter, a related art LCD device disclosed in Korean Patent Publication No. P2001-0103430, Nov. 23, 2001, which is hereby incorporated by reference for all purposes as if fully set forth herein, will be described with reference to FIG. 1.

FIG. 1 is an exploded perspective view illustrating a related art LCD device.

The Related Art LCD device 10, as shown in FIG. 1, includes first and second substrates 1 and 2 bonded to each other with a gap therebetween, and a liquid crystal layer 3 formed between the first and second substrates 1 and 2 by injection.

In more detail, the first substrate 1 includes a plurality of gate lines 4 arranged along a first direction at fixed intervals and a plurality of data lines 5 arranged along a second direction perpendicular to the first direction at fixed intervals. A plurality of pixel regions P are defined by the gate and data lines 4 and 5, respectively. A plurality of electrodes 6 are arranged within the pixel regions P. A plurality of thin film transistors T are formed at regions where the gate lines 4 cross the data lines 5 and apply data signals of the data lines 5 to the pixel electrodes 6 in accordance with signals applied to the gate lines 4.

The second substrate 2 may further include black matrix layers 7 that block light from portions except the pixel regions P, R/G/B color filter layers 8 formed to correspond to the pixel regions, for displaying various colors, and a common electrode 9 for producing the image on the color filter layers 8.

In the aforementioned related art LCD device, the liquid crystal layer 3 is formed between the first and second substrates 1 and 2, wherein liquid crystal molecules of the liquid crystal layer 3 are driven by an electric field generated between the pixel electrodes 6 and the common electrode 9. Light irradiated through the liquid crystal layer 3 may be controlled by the alignment direction of the liquid crystal molecules 3, thereby displaying an image. This type of LCD device is referred to as a twisted nematic (TN) mode LCD device.

In addition, an in-plane switching (IPS) mode LCD device has been developed. In the IPS mode LCD device, a pixel electrode and a common electrode are formed in a pixel region of a first substrate in parallel to each other at a fixed interval, so that an IPS mode electric field (horizontal electric field) occurs between the pixel electrode and the common electrode, thereby aligning a liquid crystal layer according to the IPS mode electric field.

Hereinafter, a point defect that may be observed in the related art LCD device will be described.

FIG. 2 is a plane view illustrating a point defect generated by foreign materials under a black state in a general LCD device, and FIG. 3 is a sectional view illustrating the point defect of FIG. 2 and its adjacent pixel.

As shown in FIGS. 2 and 3, a related art TN mode LCD device includes first and second substrates 1 and 2 facing each other, pixel electrodes 6 formed for every pixel region of the first substrate 1, and a common electrode 9 formed on an entire surface of the second substrate 2. Also, black matrix layers 7 are formed on a non-pixel region of the second substrate 2, and color filter layers 8 are formed on a pixel region of the second substrate 2.

In the aforementioned TN mode LCD device, if conductive foreign materials 21 remain on a predetermined portion of the pixel electrodes 6, they join the common electrode 9 of the second substrate 2, whereby the pixel electrodes 6 on the first substrate 1 are electrically connected with the common electrode 9 above the second substrate 2. Such conductive foreign materials 21 may be particles remaining on the first substrate 1 or the second substrate 2 as remaining residues resulting from an etching process of a metal or transparent electrode that do not get removed even after a cleaning process. Such conductive foreign materials 21 may also be particles generated in the first substrate 1 or the second substrate 2 during various other process steps. If the foreign materials 21 remain in the portion where the pixel electrodes 6 are formed, they allow the common electrode 9 to be electrically connected with the pixel electrodes 6. As a result, a problem occurs because the corresponding portion of the pixel electrodes 6 and the common electrode 9 is always in a shorted state due to the foreign materials 21.

In this case, in the TN mode LCD device driven in a normally white mode, the corresponding portion of the pixel electrodes 6 always shows a white state regardless of a voltage applied to the pixel electrodes 6. For this reason, a white point defect is observed during a black state where the voltage is applied. In addition, the white point defect may be generated by electrical short or burnout.

Meanwhile, even if the foreign materials 21 are not conductive, or even if the LCD device is not driven in a TN mode, the white point defect may be generated. For example, when an alignment layer is rubbed, a portion where foreign materials 21 remain may not be aligned well unlike other portions. This portion is observed as a portion where light leakage occurs. As described above, in the related art LCD device, light leakage may be generated by an uneven alignment region. Such light leakage causes the white point defect by degrading light transmittance of the liquid crystal layer 3.

Generally, in the case of a high gray (white state) level, a dark portion observed because of light leakage is referred to as a blind spot. In the case of a low gray (black state) level, a bright portion observed because of light leakage is referred to as a white point defect. Human eyes are more susceptible to the white point defect of a relatively dark state than the "blind" white point defect of a bright state. Accordingly, in determining whether the LCD panel has a defect, stricter standards are used to test whether the white point defect is generated. It is thus necessary to provide a method for minimizing defect ratio generated by a white point defect in an LCD panel.

If a defect occurs in each thin film of the first and second substrates 1 and 2, according to the related art LCD device, either a rework process or a repair process is performed. The rework process is performed by way of a deposition process of a corresponding thin film, while the repair process is performed using a laser.

However, the foreign materials 21 may still remain between the first and second substrates 1 and 2, as shown in FIGS. 2 and 3, in spite of the rework process or the repair process. If the first and second substrates are bonded to each other and the foreign materials 21 remain, it is impossible to perform the rework process. Also, it is not easy to perform the repair process. That is, the laser repair process may fail even when burnout occurs.

The aforementioned related art LCD device has several problems.

If the foreign materials remain between the upper and lower substrates in the LCD panel, the point defect is generated by the foreign materials, wherein the point defect is varied depending on modes of the LCD device. If the foreign materials remain on each thin film of the upper and lower substrates during an array process, before the bonding process of the substrates, the rework process or the repair process may be performed to remove the foreign materials. The upper and lower substrates of the LCD panel may be bonded to each other while foreign materials remain during a cleaning process which could lead to the point defect.

SUMMARY OF THE INVENTION

Accordingly, the present invention is directed to an LCD device and a method for manufacturing the same that substantially obviate one or more problems due to limitations and disadvantages of the related art.

The present invention is directed to an LCD device and a method for manufacturing the same, in which a micro hole is formed substantially in a portion of a substrate where a defect is generated, and a non-transparent material, having a similar color to that of a corresponding pixel region, is formed within the micro hole, thereby minimizing degradation of perception in the portion where the defect is generated.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, an LCD device according to the present invention comprises first and second substrates facing each other, a liquid crystal layer formed between the first and second substrates, a pixel region defined on the first and the second substrates, at least one micro hole formed from a rear surface of any one of the first and second substrates in the pixel region, the rear surface being an opposite surface of the substrate with respect to the liquid crystal layer, and a non-transparent material at least partially filled in the micro hole.

The non-transparent material may have substantially the same color as that of the color filter layer of the pixel region where the micro hole is formed.

The non-transparent material may be made of the same material as that of the pixel region where the micro hole is formed.

The non-transparent material may be a photo-curing resin.

The non-transparent material may be filled from the bottom of the micro hole and thinner than the depth of the micro hole.

The LCD device may further comprises a transparent material disposed on the non-transparent material in the micro hole.

The transparent material may be transparent resin.

The transparent resin may be a photo-curing resin.

The LCD device may further comprise first and second polarizers respectively attached on the rear surfaces of the first and second substrates.

The micro hole may substantially penetrate one of the polarizes.

The micro hole may be formed of a size corresponding to the pixel region where a foreign material exists.

The micro hole may be formed of a partial size of the pixel region to correspond to the area where a foreign material exists.

In another aspect of the present invention, a method for manufacturing an LCD device comprises detecting a portion of the LCD panel where a point defect is generated, forming at least one micro hole of a predetermined depth from a rear surface of any one of the first and second substrates at the portion where the point defect is detected, and filling the micro hole with a non-transparent material.

The method may further comprise curing the non-transparent material.

The non-transparent material may be cured by ultraviolet irradiation.

The micro hole may be formed using any one or combination of a micro drill, a milling machine, an ultrasonic machine, and a laser.

The micro hole may be filled with the non-transparent material using a nozzle which is inserted into the bottom of the micro hole.

The non-transparent material may be formed from the bottom of the micro hole thinner than the depth of the micro hole.

The method may further comprise filling a transparent material substantially on the non-transparent material in the micro hole.

The method may further comprise respectively attaching polarizers on rear surfaces of the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
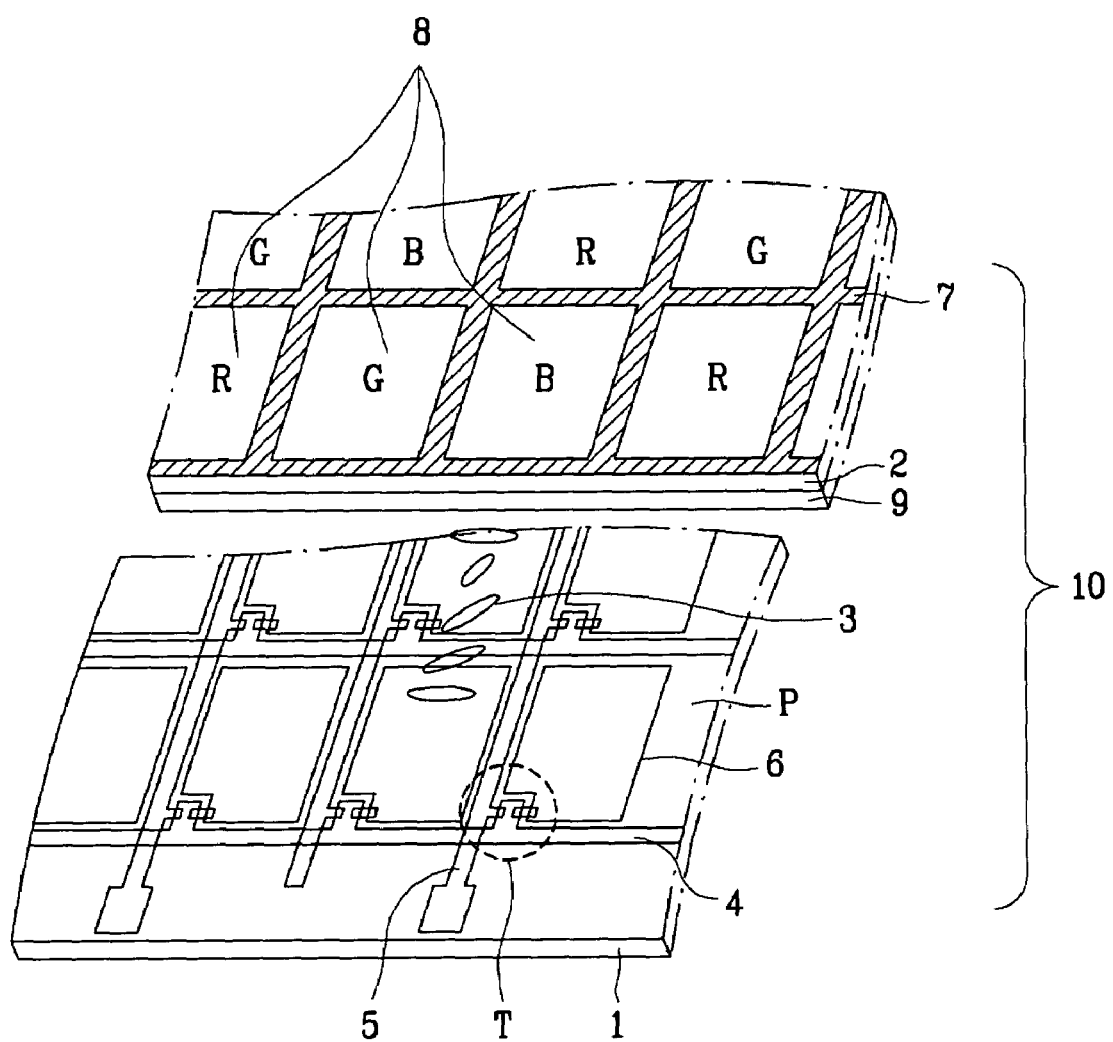
FIG. 1 is an exploded perspective view illustrating a related art LCD device.
Figure 2:
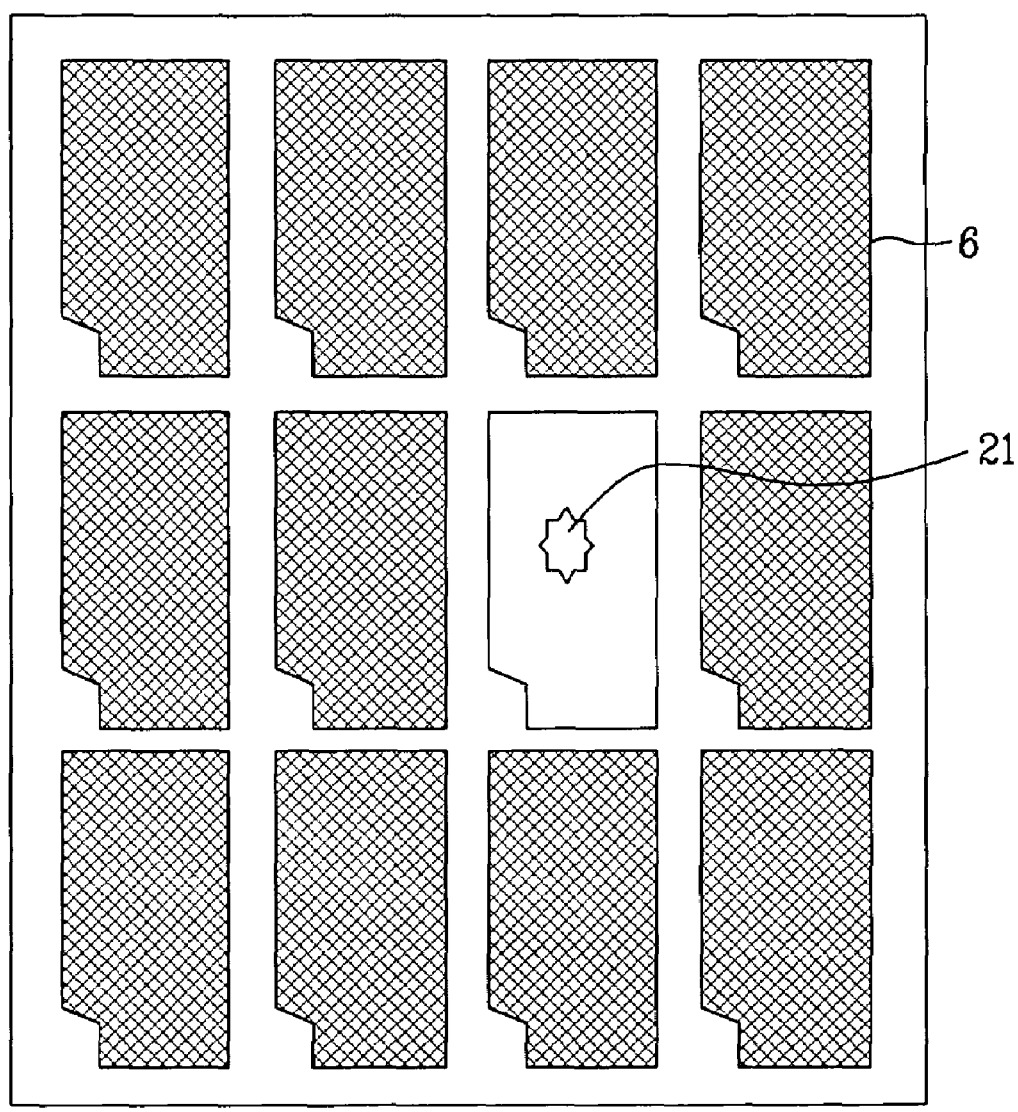
FIG. 2 is a plane view illustrating a point defect generated by foreign materials under a black state in a related art LCD device.
Figure 3:
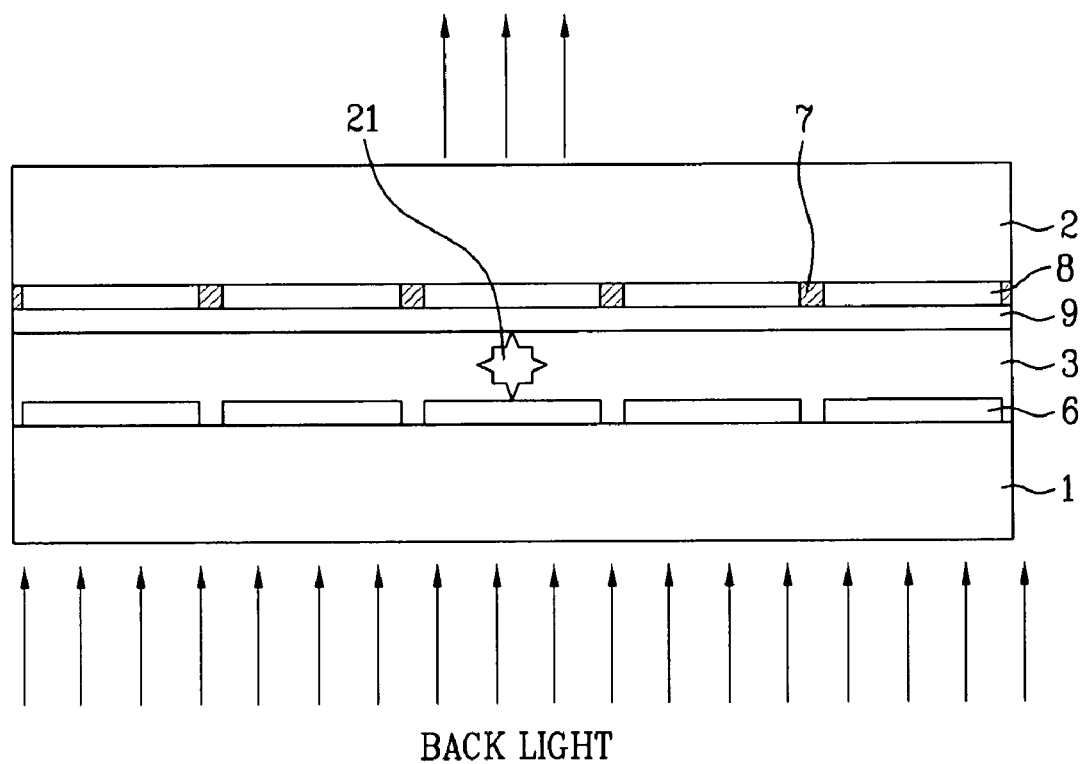
FIG. 3 is a sectional view illustrating a point defect of FIG. 2 and its adjacent pixel.
Figure 4:
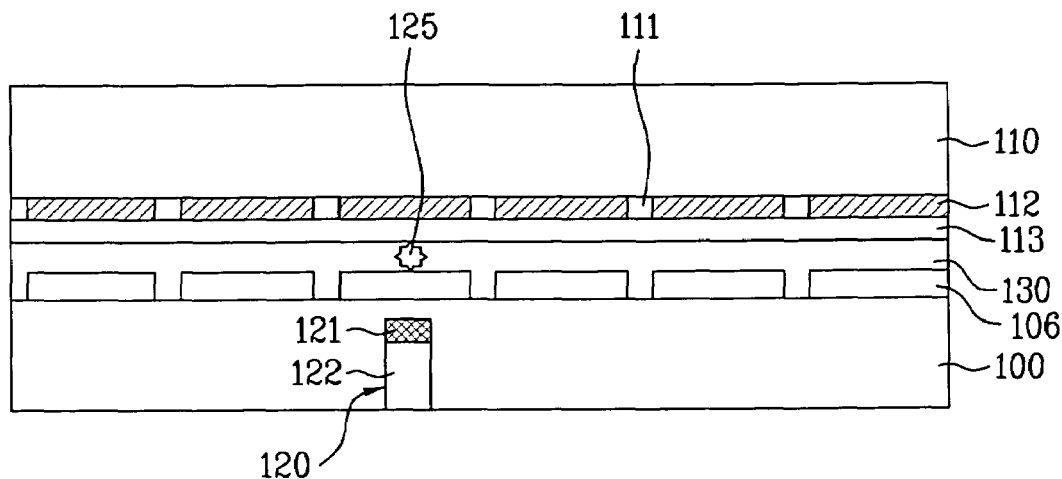
FIG. 4 is a sectional view illustrating an LCD device according to the present invention.

FIG. 4 is a sectional view illustrating an LCD device according to the present invention.

As shown in FIG. 4, in the LCD device of the present invention, a point defect generated by foreign materials remaining therein is repaired. The LCD device of the present invention comprises a first substrate 100 provided with a thin film transistor array, a second substrate 110 provided with a color filter array facing the first substrate 100, and a liquid crystal layer 130 filled between the first and second substrates 100 and 110. If foreign materials 125 remain in a predetermined portion between the first and second substrates 100 and 110, at least one micro hole 120 of a predetermined depth 'h' may be formed from a rear surface of the first substrate 100 or the second substrate 110 corresponding to a point defect generated by the corresponding foreign materials 125. A non-transparent material 121 having substantially a similar color to a color filter layer 112 of the corresponding pixel region where the foreign materials 125 are generated is formed substantially within the micro hole 120 to block the point defect in accordance with light intensity of the point defect.

The thin film transistor array formed on the first substrate 100 may include gate and data lines (not shown) crossing each other to define pixel regions, thin film transistors formed at regions where the gate lines cross the data lines, and pixel electrodes 106 formed in the pixel regions.

The color filter array formed on the second substrate 110 may include black matrix layers 111 formed to correspond to regions for example, (gate lines, data lines, and thin film transistors) except the pixel regions, color filter layers 112 formed to correspond to the pixel regions, and a common electrode 113 formed on an entire surface of the second substrate 110. Since the color filter layers 112 include the pixel regions (defined by the regions where the gate lines cross the data lines), they may partially or fully overlap the black matrix layers 111.

The color filter layers 112 may display, red, green and blue (R G B) colors. In this case, if the color of the color filter layer 112 of the corresponding pixel region where the foreign materials 125 are generated is red, the non-transparent material 121 may then be formed of a pigment material of substantially the same color as red. Also, if the color of the color filter layer 112 of the corresponding pixel region where the foreign materials 125 are generated is green, the non-transparent material 121 may then be formed of a pigment material of substantially the color of green. Likewise, if the color of the color filter layer 112 of the corresponding pixel region where the foreign materials 125 are generated is blue, the non-transparent material 121 may then be formed of a pigment material of substantially the color of blue. The non-transparent material 121 may be formed of the similar pigment material as that of the color filter layer 112 of the corresponding pixel region where the foreign materials 125 are generated. Alternatively, the non-transparent material 121 may be formed of a material that can display a similar color, although not the same material, as that of the color filter layer 112 of the corresponding pixel region.

The micro hole 120 may be filled with only the non-transparent material 121. Alternatively, the micro hole 120 may be filled with the non-transparent material 121 and a transparent material 122. In this case, some of the micro hole 120 is filled with the non-transparent material 121 from the bottom at a predetermined thickness while the other portion of the micro hole 120 is filled with the transparent material 122. If the micro hole 120 is filled with the non-transparent material 121 and the transparent material 122, transmittance of lateral incident light is better than that of the case where the micro hole 120 is filled with only the non-transparent material 121. Accordingly, it becomes possible to avoid color interference of the color filter layers 112 between the pixel region where the foreign materials are generated and its adjacent pixel regions. Also, luminance of adjacent pixel regions will not be deteriorated in comparison with luminance of normal pixel regions. The thickness of the non-transparent material 121 filled in the micro hole 120 may be in such a range that light passing through the portion of the foreign materials 125 can sufficiently be blocked.

As described above, the non-transparent material 121 may have substantially the same color as that of the color filter layer 112 corresponding to the pixel region where the foreign materials are generated. Thus, in the case of a low gray level (black state), the portion corresponding to the foreign materials 125 is dark as light transmitted from the lower portion is blocked by the thickness of the non-transparent material 121. In the case of a high gray level (white state), the portion corresponding to the foreign materials 125 appears as the color of the color filter layer 112 of the corresponding pixel region, whereby perception of the portion corresponding to the foreign materials 125 is decreased. As a result, it is possible to obtain improved perception in the LCD device of the present invention, in part because of the non-transparent material 121.

If a region of the micro hole 120 is filled with the color filter layer of the corresponding pixel region where the foreign materials are generated, the corresponding pixel region normally blocks light under the black state while obtaining an effect similar to that obtained by normal driving under the white state. As a result, it is possible to solve the point defect problem generated by the foreign materials. If the micro hole 120 is filled with the non-transparent material 121 and the transparent material 122, the non-transparent material 121 and the transparent material 122 may be liquid resins and may be hardened through a predetermined process. In this case, after the non-transparent material 121 is fully hardened, the transparent material 122 is filled in the micro hole 120. If the transparent material 122 is fully hardened, a polarizer may be attached as described later. Meanwhile, the non-transparent material 121 and the transparent material 122 may be photo-hardening resins, which are hardened by ultraviolet irradiation with a predetermined intensity for a predetermined time.

The LCD device shown in FIG. 4 corresponds to a TN mode, wherein the micro hole 120 is formed to substantially correspond to the foreign materials 125 and filled with the non-transparent material 121 (and the transparent material 122). Such a structure of the TN mode LCD device can be applied to an IPS mode LCD device or other modes of LCD devices.

The IPS mode LCD device has a structure similar to that of the TN mode LCD device except that pixel electrodes and common electrodes are alternately formed in the pixel regions of a first substrate and an overcoat layer is formed instead of the common electrode on the second substrate.

Figure 5:
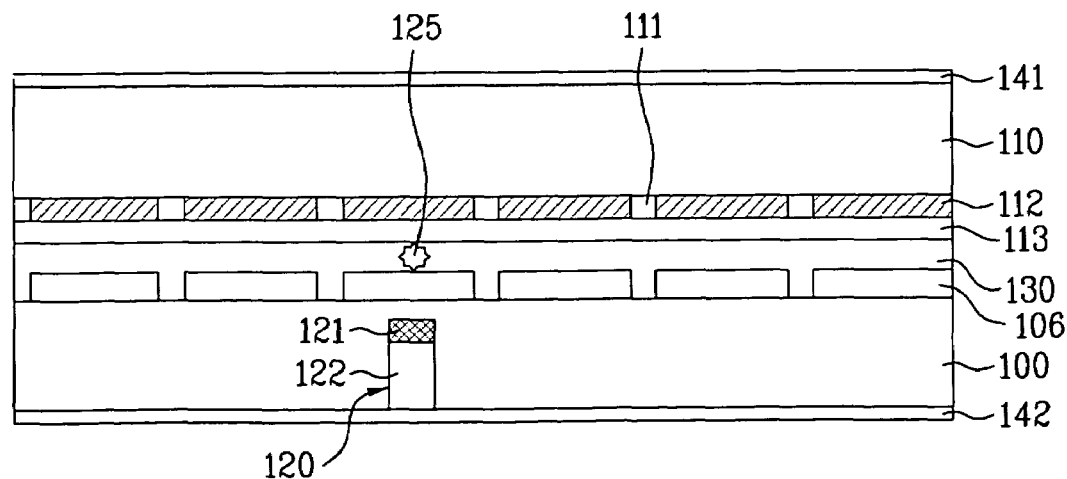
FIG. 5 is a sectional view illustrating an LCD device according to the present invention in which polarizers are attached.

FIG. 5 is a sectional view illustrating an LCD device according to the present invention in which polarizers are attached.

As shown in FIG. 5, first and second polarizers 141 and 142 are respectively formed on rear surfaces of the first and second substrates 100 and 110 constituting the LCD device manufactured as shown in FIG. 4.

After the first and second polarizers 141 and 142 are respectively attached to the rear surfaces of the second and first substrates 110 and 100, the second polarizer 142 is also attached to the portion of the micro hole 120 filled with the non-transparent material 121 and the transparent material 122.

Hereinafter, a method for manufacturing the LCD device of FIG. 4 will be described.

Figure 6A:
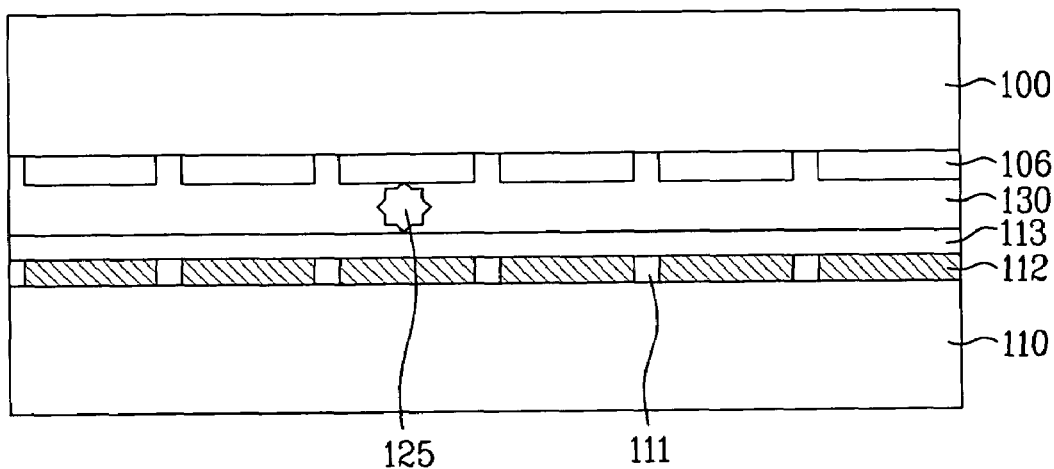
FIGS. 6A through and including 6F are sectional views illustrating a method for manufacturing an LCD device according to one embodiment of the present invention.

FIGS. 6A through and including 6F are sectional views illustrating a method for manufacturing an LCD device according to an embodiment of the present invention.

As shown in FIG. 6A, an LCD panel is prepared, which includes a first substrate 100 provided with a thin film transistor array, a second substrate 110 provided with a color filter array, facing the first substrate 100, and a liquid crystal layer 130 filled between the first and second substrates 100 and 110. Constituent elements of the thin film transistor array and the color filter array in the LCD panel may be varied depending on whether the LCD device is a TN mode or an IPS mode. The TN mode LCD device will be described with reference to the accompanying drawings.

As shown in FIG. 6A, pixel electrodes 106 are formed on the first substrate 100 to correspond to pixel regions. Black matrix layers 111, color filter layers 112 and a common electrode 113 are formed on the second substrate 110. The black matrix layers 111 are formed to correspond to regions except the pixel regions, the color filter layers 112 are formed to correspond to the pixel regions, and the common electrode 113 is formed on the entire surface of the second substrate 110.

During a black state (in this case, the LCD panel is in a normally white mode and shows a black state when a voltage is applied thereto) where a voltage signal is respectively applied to the pixel electrodes 106 and the common electrode 113, the aforementioned LCD panel is tested to check for a portion where a point defect is generated by foreign materials 125.

FIG. 6A illustrates an inverted state of the LCD panel, in which a substrate surface where a micro hole 120 (see FIG. 6B) is formed serves as an upper side after the foreign materials are tested. In FIG. 6A, such an inverted state is suggested to form the micro hole from the first substrate 100, i.e., the rear surface of the first substrate 100. However, the micro hole may be formed to correspond to the foreign materials 125 above the second substrate 110 without inverting the LCD panel, wherein the second substrate serves as an upper side.

The micro hole 120 is formed with a size substantially corresponding to the predetermined pixel region where the foreign materials 125 remain, or with a size less than the pixel region (a partial size) corresponding to the portion where the foreign materials 125 are generated.

The portion where the foreign materials 125 are generated corresponds to the portion where the point defect is generated when the LCD panel is tested while in black state when the voltage is applied. A repair process is performed for the portion where the foreign materials 125 are generated.

Figure 6B:
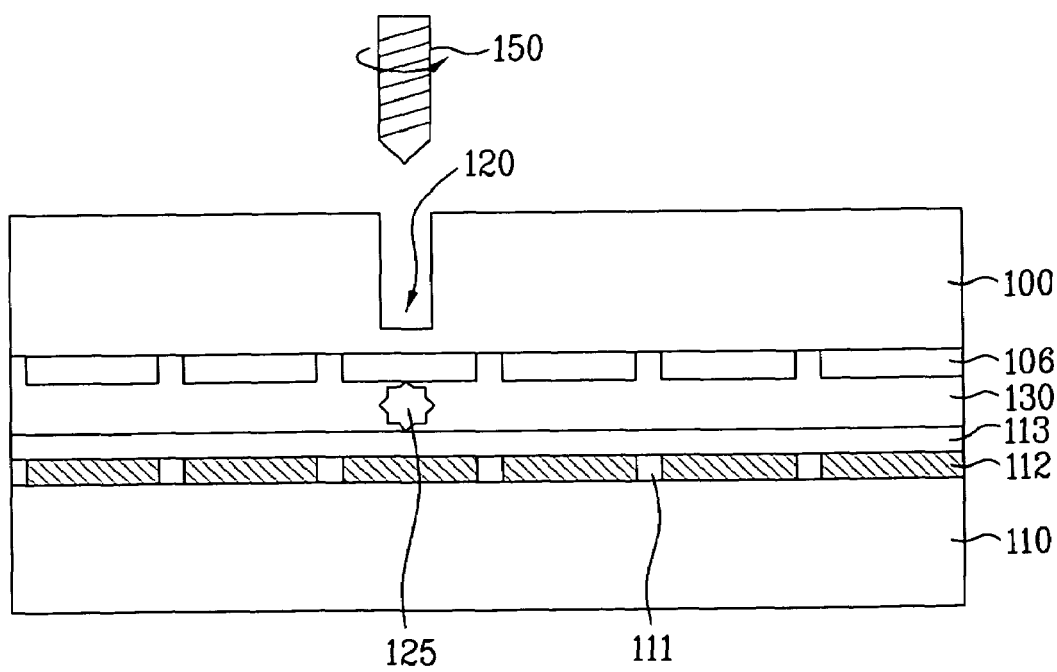

Subsequently, as shown in FIG. 6B, the portion corresponding to the foreign materials 125 is drilled from the rear surface of the first substrate 100 at a predetermined depth and width using a micro drill 150 to form at least one micro hole 120, wherein the width substantially includes the portion of the point defect generated by the foreign materials 125.

Instead of the micro drill 150, a milling machine, a laser or an ultrasonic machine may be used to form the micro hole 120. If the micro hole 120 is formed using the micro drill, the micro drill is moved in a vertical direction so that the micro hole has a substantial circular sectional shape. If the micro hole 120 is formed using the milling machine, the milling machine is moved in all directions so that the sectional shape of the micro hole is selectively obtained. Also, if the micro hole 120 is formed using the laser or the ultrasonic machine, the thickness and sectional shape of the micro hole 120 can be determined depending on irradiation or incident regions and intensity. If the first substrate 100 has a thickness of about 0.5 mm to about 0.7 mm, the micro hole 120 may have a thickness corresponding to about half or so of the thickness of the first substrate 100. For example, the thickness of the first substrate 100 remaining in the micro hole 120 may be in the range of about 0.05 mm to about 0.2 mm. The thickness and the width of the micro hole 120 are controlled considering light emitted to the side in addition to the front if a back light unit (not shown) is positioned below the first substrate 100.

Figure 6C:
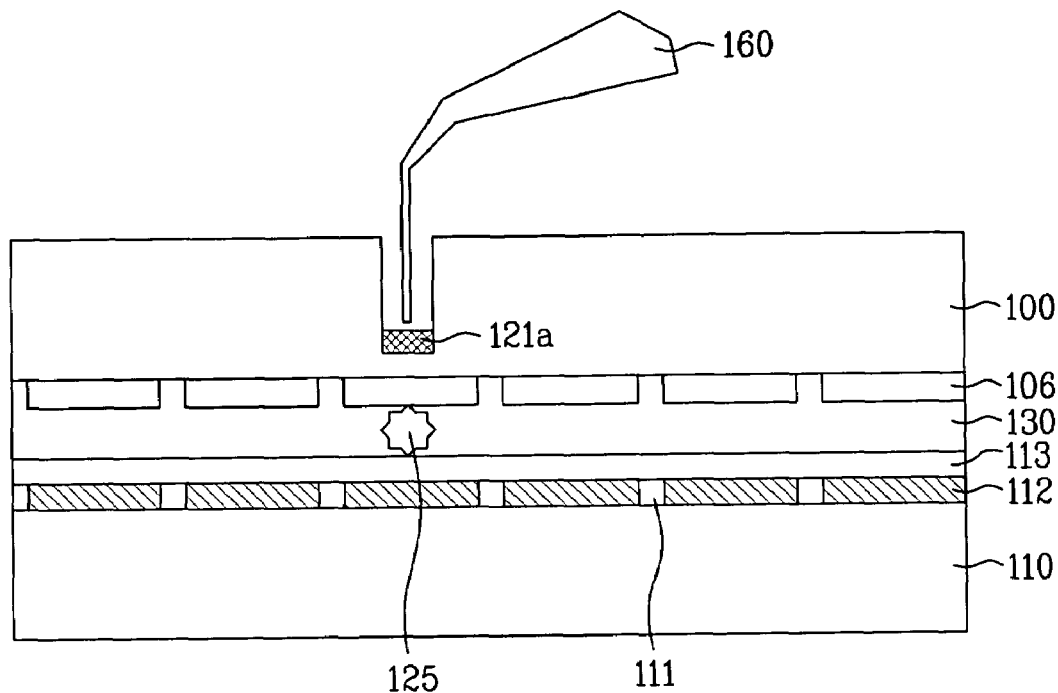

As shown in FIG. 6C, the micro hole 120 may be filled with a material 121a of substantially the same color as that of the corresponding color filter layer 112 of the pixel region where the foreign materials 125 are generated, using a first nozzle 160 whose pipe is inserted into the micro hole 120. The micro hole 120 is filled with the material 121a at a thickness that can cover the point defect generated by the foreign materials 125. The material 121a may be a liquid material having photo-hardening property. For example, a pigment material may be used as the material 121a. The micro hole 120 may be filled with the material 121a from the bottom without bubbles or cavity by inserting the nozzle first 160 into the bottom of the micro hole 120. The pipe of the first nozzle 160 is taken out from the micro hole 120 after the material 121a is completely applied into the micro hole 120.

Meanwhile, if the pipe of the first nozzle 160 is inserted near the bottom of the micro hole 120, especially when the transparent material is separately filled in the micro hole (see FIG. 6E) after the material 121a is filled therein, the material 121a does not remain in a wall of the micro hole 120 filled with the transparent material. In this case, light transmitting to the side through the transparent material can be transmitted to the upper portion at a low blocking ratio.

Furthermore, the material 121a having substantially the same color as that of the corresponding color filter layer 112 may directly be dotted in the micro hole 120 using an ink jet device instead of the first nozzle 160. Also, the material 121a may be formed in the micro hole using a spray. Alternatively, after the material 121a is sprayed into the micro hole 120 using the spray or the nozzle, the periphery of the corresponding substrate including the micro hole 120 may be covered with a vacuum cap (not shown) so that the material 121a can be moved to the bottom of the micro hole 120 using pressure difference in the micro hole 120.

Figure 6D:
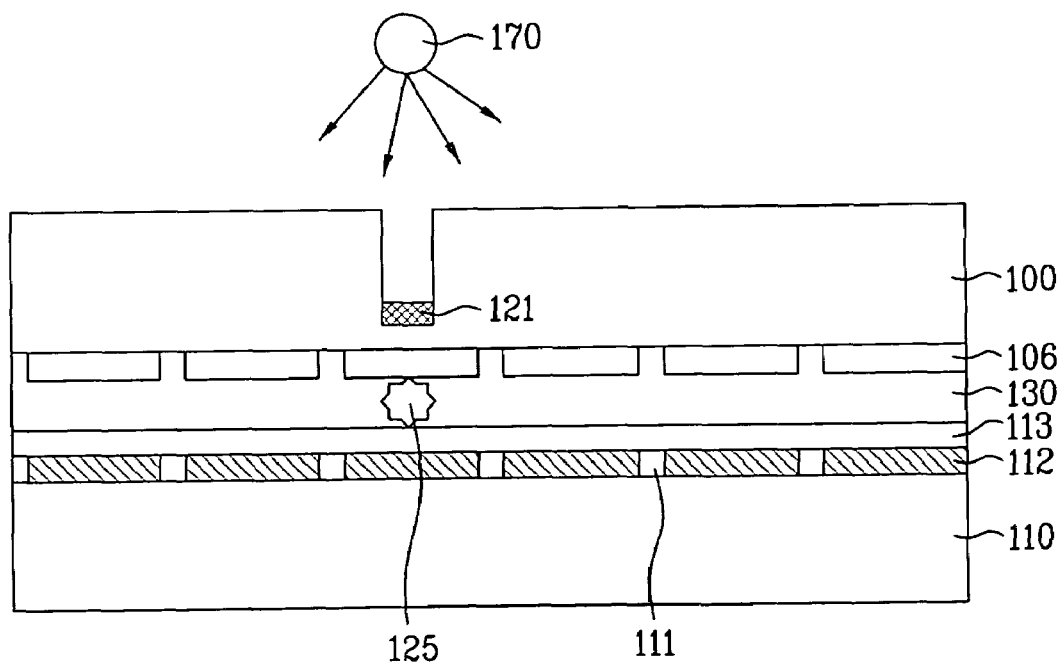

As shown in FIG. 6D, the material 121a filled in the micro hole 120 may be hardened through a first ultraviolet lamp 170 to form the hardened non-transparent material 121. This hardening process prevents blocking efficiency of the point defect from being deteriorated as the material 121a filled in the micro hole 120 is taken out due to inversion or motion or is mixed with the transparent material 122 if the material 121a is a liquid.

Figure 6E:
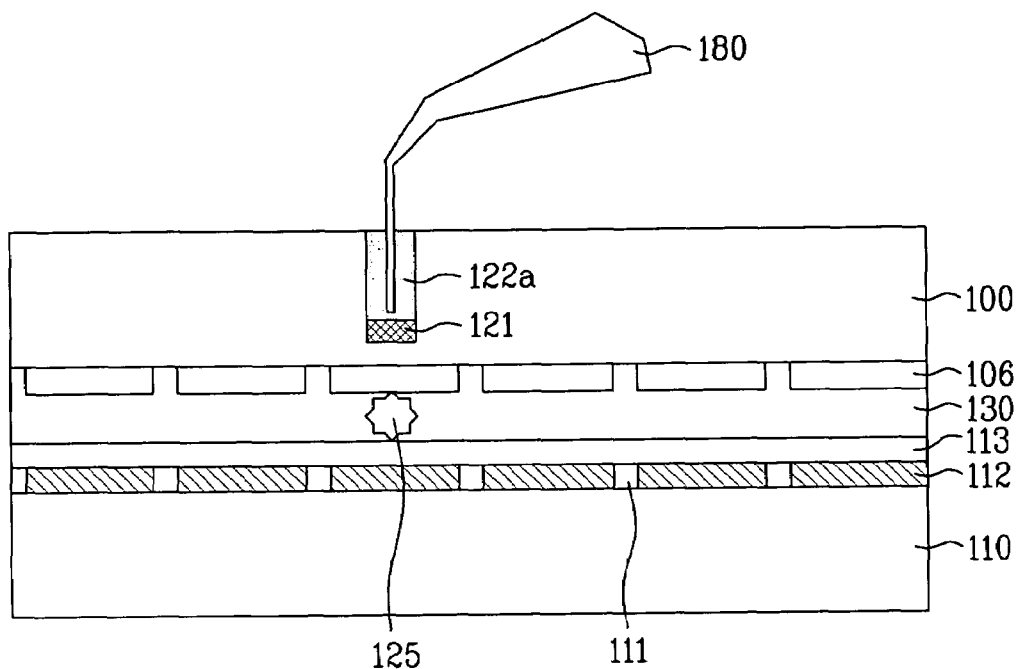

As shown in FIG. 6E, the other portion of the micro hole 120 where the non-transparent material 121 is not formed is filled with a transparent material 122a using a second nozzle 180 whose pipe is inserted into the micro hole 120. The transparent material 122a may be a liquid material having a photo-hardening property. For example, a transparent pigment material may be used as the material 122a. The pipe of the second nozzle 180 may not be inserted into the bottom of the micro hole 120 unlike the first nozzle 160. The transparent material 122a may properly be filled in the micro hole 120 along the pipe of the second nozzle 180. The other portion of the micro hole where the non-transparent material 121 is not formed is filled with the transparent material 122a without bubbles or cavity by properly controlling speed and amount. The pipe of the second nozzle 180 is taken out from the micro hole 120 after the material 122a is completely sprayed into the micro hole 120.

Meanwhile, as described above, the material 122a may directly be dotted in the micro hole 120 using the ink jet device instead of the second nozzle 180.

Figure 6F:
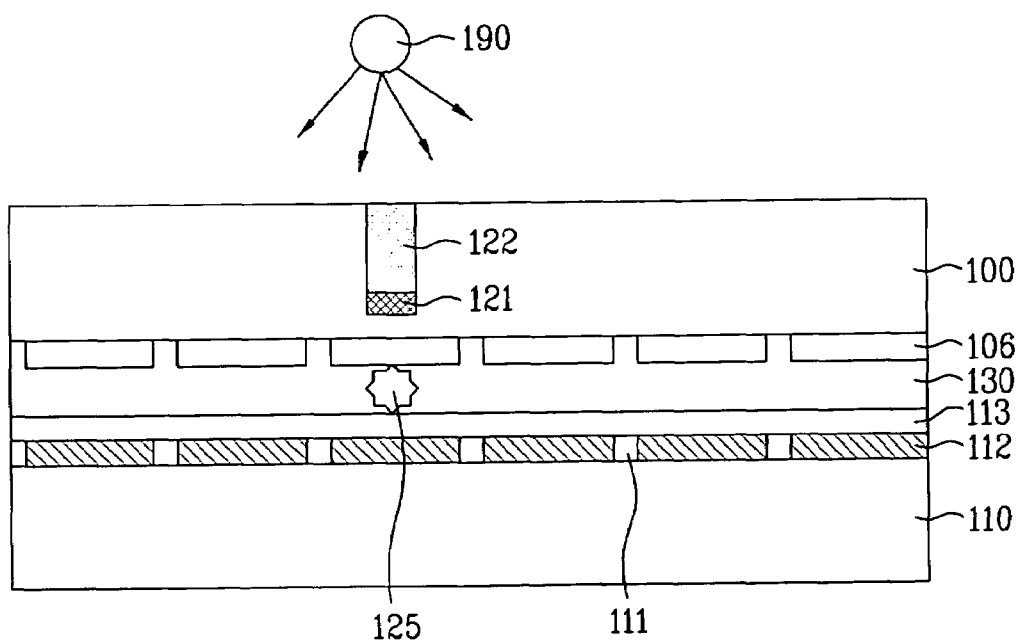

As shown in FIG. 6F, the material 122a filled in the micro hole 120 is hardened through a second ultraviolet lamp 190 to form the hardened transparent material 122. This hardening process prevents the material filled in the micro hole 120 from being taken out due to inversion or motion if the material 122a is a liquid, and enables normal transmittance of lateral light in the portion for the transparent material 122 after the LCD device is completed.

The first and second ultraviolet lamps 170 and 190 used during the hardening process of FIGS. 6D and 6F may be the same lamps.

After a repair process is completed as described above, first and second polarizers (not shown) may respectively be attached to the first and second substrates 100 and 110 of the LCD panel.

Hereinafter, a method for manufacturing an LCD device according to another embodiment of the present invention will be described with reference to FIG. 7.

Figure 7:
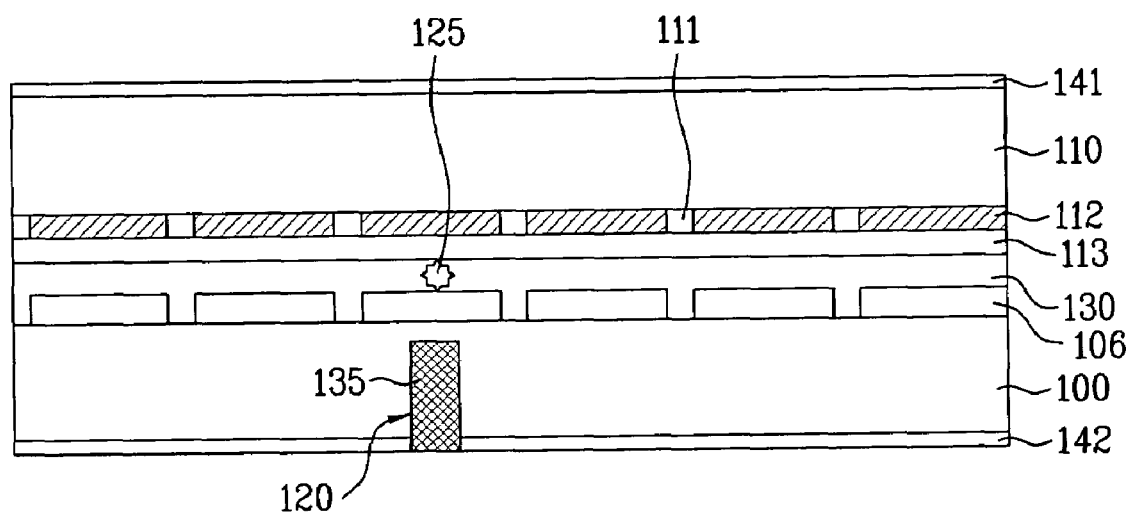
FIG. 7 is a sectional view illustrating a method for manufacturing an LCD device according to another embodiment of the present invention.

FIG. 7 is a sectional view illustrating a method for manufacturing an LCD device according to another embodiment of the present invention.

In the LCD device according to another embodiment of the present invention, the repair process is performed after polarizers are formed.

First, as shown in FIG. 6A, an LCD panel is prepared, which includes a first substrate 100 provided with a thin film transistor array, a second substrate 110 provided with a color filter array, facing the first substrate 100, and a liquid crystal layer 130 filled between the first and second substrates 100 and 110. Constituent elements of the thin film transistor array and the color filter array in the LCD panel may be varied depending on whether the LCD device is a TN mode or an IPS mode. The TN mode LCD device will be described with reference to the accompanying drawings.

In FIG. 6A, pixel electrodes 106 are formed on the first substrate 100 to correspond to pixel regions. Black matrix layers 111, color filter layers 112 and a common electrode 113 are formed on the second substrate 110. The black matrix layers 111 are formed to correspond to regions except the pixel regions, the color filter layers 112 are formed to correspond to the pixel regions, and the common electrode 113 is formed on the entire surface of the second substrate 110.

Subsequently, polarizers 142 and 141 are respectively attached on the rear surfaces of the first and second substrates 100 and 110 (see FIG. 7).

Next, the point defect generated by the foreign materials in the predetermined pixel region is detected. The point defect is detected as follows.

During a black state (in this case, the LCD panel is in a normally white mode and shows the black state when a voltage is applied thereto) where a voltage signal is respectively applied to the pixel electrodes 106 and the common electrode 113, the portion of the point defect generated by the foreign materials 125 is tested.

The portion where the foreign materials 125 are generated is observed as the point defect during the test process of testing the point defect of the LCD panel during the black state when the voltage is applied. The repair process will be performed for the portion where the foreign materials 125 are generated.

Subsequently, the micro hole 120 of a predetermined thickness is formed from the rear surface of at least one of the first and second substrates 100 and 110 including the polarizer 141 or 142 attached to the one of the substrates to correspond to the portion where the foreign materials 125 are formed.

The micro hole 120 is then substantially filled with only a non-transparent material 135 having substantially the same color as that of the color filter layer 112 corresponding to the pixel region where the foreign materials 125 are generated. If the micro hole 120 is filled with a double layer of the non-transparent material and the transparent material, lateral light passing through the transparent material passes through the portion where the polarizer 142 is removed. Lateral light which has not passed through the polarizer may cause error driving of the pixel electrode 106 where the foreign materials 125 are generated. To avoid such error in driving, the micro hole 120 may be filled with only the non-transparent material 135.

Afterwards, the non-transparent material 135 may be hardened through the hardening process of FIG. 6.

All the aforementioned methods used to form the micro hole may be used.

The method for manufacturing an LCD device can be applied to various driving modes in addition to the TN mode and the IPS mode. The point defect generated by the foreign materials is repaired to make an LCD panel having no defect.

To repair the point defect, the non-transparent material is formed with substantially the same color as that of the color filter layer of the pixel region where the point defect is generated. In this case, the point defect is completely blocked under the black state while the same color as that of the corresponding pixel region is observed under the white state. As a result, since the repaired pixel is not distinguished from its adjacent pixels, it is possible to improve a user's perception.

As described above, the LCD device and the method for manufacturing the same have the following advantages.

If a general image such as a moving image is observed, its pixels are driven with similar brightness. Based on this principle, a method for displaying a point defect with a color similar to that of its adjacent pixel is suggested. The point defect can be repaired in such a manner that the point defect or a weak point defect portion is blocked using the micro hole. After some of the micro hole is filled with the non-transparent material having the similar color to the point defect pixel, the other portion of the micro hole is filled with the transparent material. In this case, front light leakage can completely be blocked under the black state, and the repaired portion cannot be observed visually due to light emitted from the lateral pixels under the white state.

In other words, when the point defect is detected, the micro hole is formed in the portion where the point defect is generated, so that the non-transparent material having substantially the same color as that of the defect pixel is filled in the micro hole at a predetermined thickness and the transparent material is then filled therein, whereby the portion of the point defect is repaired. In this case, light is completely blocked by the thick non-transparent material under the black state, and the repaired portion is not distinguished from other portions under the white state because the micro hole is filled with the non-transparent material having substantially the color of the original pixel, whereby the user's perception can be improved.

Also, the point defect can be repaired even in a state that the polarizer is attached to the LCD panel.

Finally, since the LCD panel where the point defect is generated can be repaired under the black state, it is possible to improve yield of the LCD panel.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents. It is also noted that the shape of the micro hole is not limited to that as illustrated in the Figures and may include other suitable shapes and configurations. It is further noted that micro hole may also include an aperture or cavity.

What is claimed is:

1. An LCD device comprising:
    first and second substrates facing each other;
    a liquid crystal layer formed between the first and second substrates, a pixel region defined on the first and the second substrates;
    at least one micro hole formed from a rear surface of any one of the first and second substrates in the pixel region, the rear surface being an opposite surface of the substrate with respect to the liquid crystal layer; and
    a non-transparent material at least partially filled in the micro hole,
    wherein the micro hole and non-transparent material are formed corresponding a defect pixel for repairing the defect pixel.

2. The LCD device as claimed in claim 1, wherein the non-transparent material has substantially the same color as that of the color filter layer of the defect pixel.

3. The LCD device as claimed in claim 2, wherein the non-transparent material is made of substantially the same material as that of the defect pixel.

4. The LCD device as claimed in claim 2, wherein the non-transparent material is a photo-curing resin.

5. The LCD device as claimed in claim 1, wherein the non-transparent material is filled from the bottom of the micro hole thinner than the depth of the micro hole.

6. The LCD device as claimed in claim 5, further comprising a transparent material substantially disposed on the non-transparent material in the micro hole.

7. The LCD device as claimed in claim 6, wherein the transparent material is a transparent resin.

8. The LCD device as claimed in claim 7, wherein the transparent resin is a photo-curing resin.

9. The LCD device as claimed in claim 1, further comprising first and second polarizers respectively attached on the rear surfaces of the first and second substrates.

10. The LCD device as claimed in claim 9, wherein the micro hole penetrates one of the polarizers.

11. The LCD device as claimed in claim 1, wherein the micro hole is formed of a size corresponding to the defect pixel where a foreign material exists.

12. The LCD device as claimed in claim 1, wherein the micro hole is formed of a partial size of the defect pixel corresponding to the area where a foreign material exists.

13. A method for manufacturing an LCD device, comprising:
    detecting a portion of the LCD panel where a defect pixel is generated;
    forming at least one micro hole of a predetermined depth from a rear surface of any one of the first and second substrates at the portion where the defect pixel is detected; and
    providing a non-transparent material in the micro hole;
    wherein the micro hole and non-transparent material are formed corresponding a defect pixel for repairing the defect pixel.

14. The method as claimed in claim 13, further comprising curing the non-transparent material.

15. The method as claimed in claim 14, wherein the non-transparent material is cured by ultraviolet irradiation.

16. The method as claimed in claim 13, wherein the micro hole is formed by using any one or combination of a micro drill, a milling machine, an ultrasonic machine, and a laser.

17. The method as claimed in claim 13, wherein the micro hole is filled with the non-transparent material using a nozzle which is inserted into the bottom of the micro hole.

18. The method as claimed in claim 13, wherein the non-transparent material is formed from the bottom of the micro hole thinner than the depth of the micro hole.

19. The method as claimed in claim 18, further comprising filling a transparent material on the non-transparent material in the micro hole.

20. The method as claimed in claim 13, further comprising respectively attaching polarizers on rear surfaces of the first and second substrates.

* * * * *